United States Patent Office 3,242,140
Patented Mar. 22, 1966

3,242,140
ADDITION HOMO AND COPLYMERS FROM DI
AND TRI METHYL ALLYL ISOCYANATES
Fred W. Hoover, Wilmington, Del., assignor to E. I. du
Pont de Nemours and Company, Wilmington, Del., a
corporation of Delaware
No Drawing. Filed Nov. 1, 1961, Ser. No. 149,177
5 Claims. (Cl. 260—77.5)

This invention relates to new ethylenically unsaturated isocyanates, a method for preparing them, to polymers of the novel isocyanates, and to post-reaction products of such polymers. This application is a continuation-in-part of assignee's copending application Serial No. 29,134, filed May 16, 1960 (abandoned February 20, 1963).

A wide variety of unsaturated compounds are known that can be polymerized by addition polymerization techniques to valuable polymers. Many of these polymers have achieved commercial success because of the particular properties they possess. In some cases, it is desirable to change the properties of a polymeric product by subjecting the polymer to chemical reactions of various types to make the polymer more useful for specific applications. It is therefore a desirable goal to provide new polymerizable ethylenically unsaturated monomers that are capable of forming polymers having useful properties and are also capable of being chemically modified due to the presence of reactive sites in the polymers.

Novel ethylenically unsaturated isocyanates especially useful for the preparation of addition polymers are provided by this invention. The novel products of this invention are the methyl substituted allyl isocyanates of the formula:

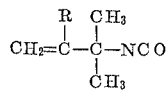

wherein R is hydrogen or the methyl group (—CH$_3$), their polymers (including both homopolymers and copolymers with one or more polymerizable ethylenically unsaturated monomers), and the post-reaction products of such polymers.

The methyl substituted allyl isocyanates of this invention possess certain unexpected properties that markedly enhance their value as comonomers with certain ethylenically unsaturated monomers. For example, α,α-dimethylallyl isocyanate is capable of forming high molecular weight copolymers with ethylene whereas allyl isocyanate gives only very low molecular weight copolymers. Moreover, vinyl and isopropenyl isocyanates undergo considerable 1,4-polymerization (i.e., polymerization involving the carbon of the isocyanate group with the β-carbon of the ethylenic group) to give polymers having

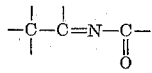

structural units which possess undesirable properties. For example, copolymers of vinyl and isopropenyl isocyanates have low modulus and are insoluble or only poorly soluble in common organic solvents. In contrast, α,α-dimethylallyl isocyanate does not undergo such 1,4-polymerization and does not develop such undesirable properties.

The monomeric methyl substituted allyl isocyanates of this invention can be prepared by the process being claimed in co-assigned U.S. application Serial No. 29,134, filed May 16, 1960 (abandoned February 20, 1963), by F. W. Hoover. This process comprises reacting isocyanic acid with an unsaturated hydrocarbon of the formula

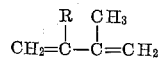

wherein R is hydrogen or the methyl group, at a temperature between 25° and 200° C. (preferably between 75° and 150° C.). Higher reaction temperatures are generally avoided in order to minimize polymerization of the reactants. The addition reaction is facilitated by the presence of an acid catalyst, although the use of such a catalyst is not essential. Preferred acid catalysts are materials which act as strong acids in aqueous solutions to produce pH values of not more than about 3 and pKa values of not more than about 2. Specific acid catalysts that can be used include metaphosphoric acid, boron trifluoride, zinc chloride, sulfonic acids, etc., as well as salts of such strong acids with weak bases such as ammonia or amines. The amount of acid catalyst is not critical but quantities ranging from 0.1 to 10% of the total weight of the reactants are satisfactory.

It is sometimes advantageous, but not essential, when carrying out the reaction at temperatures above 150° C. to employ a polymerization inhibitor, e.g., hydroquinone, to prevent polymerization of the reactants. Likewise, the use of an inert reaction medium in the process is not essential, but it is preferable. Suitable reaction media are those which are liquid under the reaction conditions and which are inert to the reactants and acid catalyst, if one is used. Preferred reaction media include hydrocarbons such as benzene, toluene, xylene and heptane.

The reaction is conveniently carried out under pressure, e.g., the autogenous pressure developed in a closed reaction vessel under the reaction conditions, in order to achieve useful concentrations of reactants, especially at elevated temperatures.

A novel method for the preparation of the monomeric methyl substituted allyl isocyanates of this invention comprises reacting an alkenyl halide of the formula:

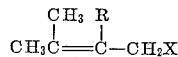

wherein R is hydrogen or the methyl group, and X is a halogen of atomic number 17–53, i.e., chlorine, bromine or iodine, with a suspension of Group I metal cyanate in an inert, organic liquid. An exothermic reaction, involving an allylic or 1,3-shift, takes place to form the products of this invention as soon as the alkenyl halide is added to the metal cyanate, and the reaction rate is controlled by the rate of addition of the alkenyl halide. When the reaction subsides, the solid metal halide by-product is conveniently removed by filtration and the filtrate fractionally distilled to isolate the methyl substituted allyl isocyanate that is formed.

The particular inert, organic liquid employed is not critical provided, of course, that it is inert to the reactants and the methyl substituted allyl isocyanates. Suitable liquid media include diethyl ether, toluene and carbon tetrachloride. Other inert, organic liquids will be obvious to those skilled in the chemical arts.

The alkenyl halide of the formula given in the preceding paragraph can be reacted with any Group I metal cyanate, e.g., potassium, sodium or lithium cyanates. However, best results are obtained when silver cyanate is employed. With the Group IA metal cyanates, polar solvents such as dimethylformamide and dimethylsulfoxide are particularly useful as reaction media.

Neither the reaction pressure nor the temperature of the alkenyl halide and the metal cyanate at the time they are contacted is critical. Thus, it is most convenient, and, therefore, preferred, to admix the reactants at room temperature and atmospheric pressure. As stated above, an exothermic reaction takes place upon contact of the reactants. The rate of addition of the alkenyl halide to the suspension of metal cyanate is not critical but it is preferably adjusted to prevent excessive boiling of the reaction mixture. The actual rate of addition in any specific case is dependent on the particular alkenyl halide, metal cyanate and reaction medium employed, as well as on the efficiency of the cooling means with which the reaction vessel is equipped.

As indicated above, the monomeric methyl substituted allyl isocyanates of this invention can be polymerized by themselves or copolymerized with one or more other polymerizable ethylenically unsaturated monomers to form homopolymers or copolymers having valuable properties. The polymerization can be carried out by conventional methods using conventional addition polymerization initiators. The polymerization is conveniently carried out by bulk or solution methods. Addition polymerization initiators that can be used include free radical liberating initiators of the peroxide type, e.g., benzoyl peroxide, tertiary butyl peroxide, and the like, and of the azo type, e.g., $\alpha,\alpha'$-azodiisobutyronitrile, $\alpha,\alpha'$-azodiisobutyramide and dimethyl $\alpha,\alpha'$-azodiisobutyrate, etc. Ionic initiators, e.g., boron trifluoride, and coordination initiators, e.g., a mixture of triethyl aluminum with tetraisopropyl titanate, a mixture of triisobutyl aluminum with triphenyl vanadate, etc. can also be used. These initiators are employed in the usual concentrations ranging from 0.01% to 10% of the weight of the monomers being polymerized. The polymerization can be carried out over a wide range of temperatures. The actual temperature selected in a given case will depend on the particular monomers being employed and the particular polymerization initiator being used. Thus, temperatures ranging from 0° C. or lower up to 125° C. or higher can be employed. The pressure under which the polymerization is carried out is not critical, but pressures ranging from atmospheric or lower to 1000 atmospheres or more are operable.

Polymers of the invention, including both homopolymers and copolymers prepared as described above, are highly useful for the formation of post-reaction products. Because the polymers contain reactive sites (those bearing isocyanate groups), they undergo post-reactions with chemical reagents having reactive hydrogen, as determined by the Zerewitinoff method which is described in J. Am. Chem. Soc., 49, 3181 (1927). Such reagents include, e.g., water, alcohols, phenols and amines. The temperature and pressure at which the polymer and the active hydrogen-containing compound are reacted is not critical and will necessarily depend upon the particular reactants employed. Usually, a mixture of the polymer and reagent are heated at increasingly higher temperatures until the desired degree of reaction occurs as evidenced by the properties of the post-reaction product. Generally, the temperature will be at least 100° C. When films, laminates, and shaped articles are desired, the reaction is conveniently carried out by contacting the polymer and reagent under melt-press conditions to simultaneously effect the reaction and shape the reaction product. The temperature and pressure employed under such circumstances will, of course, depend upon the softening point of the polymer employed. Although the polymer and active hydrogen-containing compound will react in the absence of a catalyst, a catalyst such as dibutyltin dilaurate is preferably employed to increase the yield of post-reaction product.

The monomeric, polymeric, and post-reaction products of this invention, and their methods of preparation are described in further detail in the following examples, in which the proportions of ingredients are expressed in parts by weight unless otherwise specified.

*Example I.—Preparation of $\alpha,\alpha,\beta$-trimethylallyl isocyanate*

A mixture of 200 ml. of benzene, 22 g. of 2,3-dimethyl-1,3-butadiene, 53 g. of isocyanic acid, and 7.4 g. of anhydrous p-toluenesulfonic acid is heated for 8 hours at 100° C. in a reaction vessel capable of withstanding high pressures. Distillation of the reaction mixture gives the following fractions:

| Fraction No. | B.P., °C./mm. | Weight (g.) |
|---|---|---|
| 1 | 44/152–40/100 | 1.60 |
| 2 | 47–61/100 | 0.85 |
| 3 | 61–68/100 | 1.44 |
| 4 | 68–69/100 | 1.96 |
| 5 | 37/22–29/11 | 1.0 |
| 6 | 44/2–48/1.8 | 0.13 |
| 7 | 52/1.8–56/1.45 | 1.27 |
| 8 | 61/0.35 | 1.24 |
| Residue | | 8.5 |

Infrared, near-infrared, and nuclear magnetic resonance analysis shows that Fraction 4 is largely $\alpha,\alpha,\beta$-trimethylallyl isocyanate, $CH_2=C(CH_3)C(CH_3)_2NCO$.

*Analysis.* — (Fraction 4) calc'd for $C_7H_{11}NO$: C, 67.2%; H, 8.8%; N, 11.2%. Found: C, 68.67%; H, 9.14%; N, 10.01%.

*Example II. — Preparation of $\alpha,\alpha$-dimethylallyl isocyanate*

A mixture of 2000 ml. of xylene, 1500 ml. of isoprene, 70 ml. of isocyanic acid and 14 g. of ammonium p-toluenesulfonate is heated 3 hours at 100° C. The solid that forms in the reaction mixture is removed by filtration and the filtrate is distilled through a precision still. There is obtained 50 g. of $\alpha,\alpha$-dimethylallyl isocyanate boiling at 100–105° C. Redistillation gives $\alpha,\alpha$-dimethylallyl isocyanate boiling at 105° C. and having a refractive index, $n_D^{25}$, of 0.4100.

The infrared absorption spectrum of $\alpha,\alpha$-dimethylallyl isocyanate shows bands at 2.7 microns (characteristic of tertiary isocyanates of this type), 4.4 microns (NCO), 6.1 microns ($>C=C<$), 7.28 and 7.37 microns (gem-dimethyl), and 10.15 and 10.85 microns ($CH_2=CH-$). The proton magnetic resonance spectrum obtained on this isocyanate is also consistent with the proposed structure.

$\alpha,\alpha$-Dimethylallyl isocyanate reacts exothermically with 2-ethylhexylamine to produce the urea,

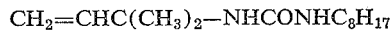

Infrared absorption confirms the structure.

*Analysis.*—Calc'd for $C_{14}H_{23}N_2O$: N, 11.6%. Found: N, 11.1%.

*Example III.—Preparation of $\alpha,\alpha$-dimethylallyl isocyanate*

To a mixture of 100 ml. of diethyl ether and 30 g. of silver cyanate is added 13.5 g. of 3-methyl-2-butenyl chloride over a period of 88 minutes. The reaction that takes place is exothermic. After removing the solid silver chloride from the reaction mixture by filtration, the filtrate is distilled through a precision still. There is obtained 5.9 ml. of $\alpha,\alpha$-dimethylallyl isocyanate, B.P. 105° C., $n_D^{25}$, 1.4100. There is also obtained 6 ml. of $\gamma,\gamma$-dimethylallyl isocyanate, B.P. 140° C., $n_D^{25}$, 1.4393. These products are identified by their infrared absorption spectra. The nitrogen content of the higher boiling isomer is found to be 12.7%. This is in good agreement with the calculated value of 12.6%.

By substituting 2,3-dimethyl-2-butenyl chloride, -bromide, or -iodide for the 3-methyl-2-butenyl chloride in the process of Example III, there is obtained $\alpha,\alpha,\beta$-trimethylallyl isocyanate.

*Example IV.—Preparation of poly($\alpha,\alpha$-dimethylallyl isocyanate)*

A mixture of 1 ml. of $\alpha,\alpha$-dimethylallyl isocyanate and 0.04 g. of benzoyl peroxide is heated in a sealed glass tube under nitrogen for 21 hours at 80° C. The reaction mixture is then poured into acetone, whereupon a solid homopolymer of α,α-dimethylallyl isocyanate precipitates. This homopolymer is found to have, after drying, a softening point of 170° C. The infrared absorption spectrum of this homopolymer shows the presence of isocyanate groups and is in general agreement with that expected for a homopolymer of $CH_2=CHC(CH_3)_2NCO$.

*Example V.—Preparation of poly(α,α-dimethylallyl isocyanate)*

To a solution of 0.35 g. (1 millimole) of phenyl vanadate in 25 ml. of benzene is added 3.0 ml. (3 millimoles) of triisobutylaluminum solution. After aging the catalyst for 0.5 hour, 5 ml. of α,α-dimethylallyl isocyanate is added. The mixture is stirred at room temperature for 36 hours. A small amount of the benzene solution is cast on a potassium bromide pellet and dried in vacuo. The resulting residue is a glassy, solid homopolymer of α,α-dimethylallyl isocyanate. The infrared absorption spectrum shows the presence of an isocyanate absorption band at 4.45 microns.

The following examples illustrate the preparation of various copolymers of the methyl substituted allyl isocyanates of this invention.

*Example VI.—Preparation of α,α-dimethylallyl isocyanate/butyl acrylate copolymer*

A mixture of 0.9 g. of α,α-dimethylallyl isocyanate, 0.9 g. of butyl acrylate and 0.04 g. of α,α'-azodiisobutyronitrile is heated in a sealed glass tube for 20 hours at 80° C. The viscous reaction product obtained, amounting to 1.45 g., is heated at 80° C. under 2 mm. pressure to remove unreacted monomers. There is obtained 0.92 g. of a viscous copolymer of α,α-dimethylallyl isocyanate with butyl acrylate. The infrared absorption spectrum obtained on this copolymer shows strong absorption at 4.43 microns (NCO) and indicates that the copolymer contains about 37% of combined α,α-dimethylallyl isocyanate.

*Example VII.—Preparation of α,α'-dimethylallyl isocyanate/styrene copolymer*

A mixture of 0.9 g. of α,α-dimethylallyl isocyanate, 0.9 g. of styrene and 0.04 g. of α,α'-azodiisobutyronitrile is heated in a sealed glass tube for 20 hours at 80° C. Addition of petroleum ether to the crude reaction product precipitates a solid copolymer of α,α-dimethylallyl isocyanate and styrene. This polymer amounts to 0.74 g. after drying under vacuum at 45° C. The copolymer has a softening point of 125–130° C. The infrared absorption spectrum of this copolymer indicates that it contains about 5% of combined α,α-dimethylallyl isocyanate.

*Example VIII.—Preparation of α,α-dimethylallyl isocyanate/acrylonitrile copolymer*

A reaction vessel is charged with 400 ml. of dimethylformamide (containing less than 0.05% water), 160 g. of acrylonitrile (distilled over phosphorus pentoxide to remove inhibitors and water), and 8.0 g. of α,α-dimethylallyl isocyanate. The mixture is swept with nitrogen and blanketed with nitrogen after adding 0.84 g. of α,α'-azodiisobutyronitrile. The reaction mixture is heated and stirred under nitrogen for 16 hours at 60° C. The reaction mixture is poured into diethyl ether to coagulate the polymer and remove unreacted monomers. After drying, the copolymer of α,α-dimethylallyl isocyanate and acrylonitrile is found to amount to a yield of 40% of the theoretical. The copolymer contains about 3% combined α,α-dimethylallyl isocyanate. This copolymer is soluble in the usual solvents for acrylonitrile but becomes insoluble when stored as a solid at room temperature for more than six days.

*Example IX.—Preparation of α,α-dimethylallyl isocyanate/styrene copolymer*

The procedure described in Example VIII is repeated with the exception that 160 g. of styrene is substituted for the acrylonitrile and 0.17 g. of boron trifluoride is substituted for the α,α'-azodiisobutyronitrile and the reaction is carried out at 70° C. for 0.5 hour. There is obtained a low yield of a copolymer of α,α-dimethylallyl isocyanate and styrene.

*Example X.—Preparation of α,α-dimethylallyl isocyanate and ethylene copolymer*

A reaction vessel capable of withtanding high pressures and being shaken and having a capacity of 300 cc. is charged with 112 ml. of benzene, 0.2 g. of α,α'-azodicyclohexanecarbonitrile, and 1.6 g. (0.0145 mole) of α,α-dimethylallyl isocyanate. Ethylene is then introduced into the reaction vessel until a pressure of 3500 lb./sq.in. is obtained at room temperature. The reaction vessel is then heated to 115–125° C. Ethylene is added during the course of the reaction to keep the pressure between 12,000 and 12,500 lb./sq.in. When a total of 20 g. (0.714 mole) of ethylene has been added, the reaction is stopped by cooling the reaction vessel and the excess ethylene is bled from the vessel. The polymer is removed from the reactor and dissolved in refluxing benzene in order to remove unreacted unsaturated isocyanate. The benzene solution is then cooled to precipitate the polymer, which is then dried at 50° C. in a vacuum oven. A melt-pressed film of this copolymer of α,α-dimethylallyl isocyanate and ethylene has an infrared absorbance at 4.45 microns. This indicates the presence of isocyanate, NCO, in the polymer.

The substitution of α,α,β-trimethylallyl isocyanate for α,α-dimethylallyl isocyanate in the processes of Examples IV–X results in the formation of corresponding α,α,β-trimethylallyl isocyanate homopolymers and copolymers.

Copolymers of α,α-dimethylallyl isocyanate with alpha olefins, are particularly useful and therefore constitute a preferred embodiment of the invention. Such copolymers, in addition to the ethylene/α,α-dimethylallyl isocyanate copolymer of Example X, may be prepared by the process of Example X merely by substituting the appropriate alpha olefin for the ethylene therein. Suitable alpha olefins include, e.g., propylene, 1-butene, and 1-hexene. Moreover, diolefins such as 1,3-butadiene and 1,4-hexadiene may be employed in place of the alpha olefin. These copolymers not only form self-supporting films as illustrated by Example X, but due to their superior adhesive properties, they may also be cast upon a substrate to form an adherent coating thereon. For example, ethylene/α,α-dimethylallyl isocyanate copolymers prepared as in Example X and containing between 1 and 4 mole percent α,α-dimethylallyl isocyanate, when melt-pressed on cellophane or aluminum foil at 170° C. and 20 tons pressure, adhere firmly to the substrate. In contrast, ethylene homopolymer of equal molecular weight does not exhibit these adhesive properties. The utility of the subject copolymers is not, however, limited to the preparation of films or coatings but extends as well to the preparation of molded articles, and to the preparation of other highly useful polymers by post-reactions as will hereinafter more fully appear.

In addition to the specific copolymers illustrated by Examples VI to X and the two preceding paragraphs, the methyl substituted allyl isocyanates of this invention can be copolymerized with any other ethylenically unsaturated compound capable of addition polymerization as will be apparent to those skilled in polymer chemistry. Thus, they can be copolymerized with vinyl and vinylidene halides, e.g., vinyl fluoride and vinylidene chloride; vinyl esters, e.g., vinyl acetate and vinyl benzoate; vinyl ketones, e.g., methyl vinyl ketone and methyl isopropenyl ketone; acrylic and methacrylic esters and nitriles, e.g., ethyl acrylate, methyl methacrylate, methacrylonitrile; and substituted ethylenes, e.g., trifluoroethylene, chlorotrifluoroethylene and tetrafluoroethylene.

The methyl substituted allyl isocyanate monomers of this invention are greatly superior to known ethylenically unsaturated isocyanates for copolymerization with ethylene. As illustrated by Example X, α,α-dimethylallyl isocyanate copolymerizes with ethylene to form a high molecular weight copolymer useful for various purposes. In contrast, unsubstiuted allyl isocyanate gives only very low molecular weight copolymers with ethylene. Moreover, vinyl and isopropenyl isocyanates undergo considerable 1,4-polymerization when copolymerized with ethylene and this results in undesirable polymer properties. Thus, copolymerization of ethylene with vinyl isocyanate and with isopropenyl isocyanate results in the formation of crosslinked copolymers, some of which are insoluble in common solvents and have low moduli.

*Example XI.—Post-reaction of α,α-dimethylallyl isocyanate/ethylene copolymer*

One part of a copolymer of ethylene and α,α-dimethylallyl isocyanate containing 3% by weight of the isocyanate is blended with 2 parts of polyethylene and 780 p.p.m. of dilauryl thiodipropionate (as stabilizer) at 135° C. on rubber rolls. The resulting blend is extruded at 360° C. onto a sheet of cellophane impregnated with 20% glycerol (as softener). The resulting 1-mil coating of the polymer blend adheres to the cellophane. The tenacity of the bond between the coating and the cellophane substrate indicates that a post-reaction has occurred between the isocyanate groups in the polymer blend and the hydroxyl groups in the softener.

*Example XII.—Post-reaction of α,α-dimethylallyl isocyanate/ethylene copolymer*

Three parts of a polymer of ethylene and α,α-dimethylallyl isocyanate containing 3% by weight of the isocyanate is ground in a mortar with 0.8 part of hexamethylenediamine and 0.3% of dibutyltin dilaurate as catalyst until a uniform blend is obtained. The resulting blend is pressed into a film at 135° C. under one ton pressure for one minute. The pressed film is then washed with benzene and dried. The infrared absorption spectrum obtained on the film shows that all the isocyanate groups have reacted.

When the procedure described in the preceding paragraph is repeated with the exception that 2% dibutyltin dilaurate is used as catalyst, an insoluble crosslinked film is obtained.

In addition to glycerol and hexamethylenediamine, other compounds containing Zerewitinoff active hydrogen, e.g., water, ethanol, phenol, aniline and N-butylamine, will react with the polymers of the invention to yield polymers having modified properties. For example, benzene solutions of ethylene/α,α-dimethylallyl isocyanate copolymer react with the above-mentioned reagents under melt-press conditions in the absence of any catalyst. However, improved yields are obtained under the same conditions when a catalyst such as dibutyltin dilaurate is employed. The post-reaction technique is particularly useful to provide a molecular bond, as opposed to a physical bond, between a polymer of the invention and a substrate, e.g., cellophane, when coating or laminating with such polymers.

An especially valuable property of the methyl substituted allyl isocyanate polymers of this invention, including both homopolymers and copolymers, is their ability to post-react with amine-modified dyes to form colored polymers that are useful for forming colored films, fibers, and molded shaped articles of high durability. For example, a copolymer of α,α-dimethylallyl isocyanate and acrylonitrile of the type described in Example VIII can be dyed by an aqueous bath containing the amine-modified dispersed dye known as "Celanthrene" Pure Blue BRS. The high durability of the dyed polymer in boiling water indicates that a reaction has occurred between the isocyanate groups of the polymer and the dye in the presence of water.

Since obvious modifications and equivalents in the invention will be evident to those skilled in the chemical arts, I propose to be bound solely by the appended claims.

The embodiments of the invention in which an exclusive property or privilege is claimed are defined as follows:

1. An ethylenic addition homopolymer of an isocyanate selected from the group consisting of α,α-dimethylallyl isocyanate and α,α,β-trimethylallyl isocyanate.

2. An ethylenic addition homopolymer of α,α-dimethylallyl isocyanate.

3. An ethylenic addition copolymer of at least 1 mole percent of an isocyanate having

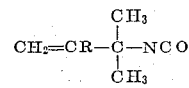

wherein R is selected from the group consisting of hydrogen and the methyl group, and an alpha olefin of 2–6 carbon atoms.

4. An ethylenic addition copolymer of claim 3 wherein the alpha olefin is ethylene.

5. The article formed by simultaneously coating and reacting a substrate of cellophane impregnated with glycerol with the ethylenic addition copolymer of claim 3.

References Cited by the Examiner

UNITED STATES PATENTS

| | | | |
|---|---|---|---|
| 2,503,209 | 4/1950 | Nyquist et al. | 260—77.5 |
| 2,606,892 | 8/1952 | Kropa | 260—77.5 |
| 2,713,591 | 7/1955 | Bortnick | 260—471 |
| 2,866,803 | 12/1958 | De Pree | 260—453 |

OTHER REFERENCES

"Chemistry of Organic Isocyanates," Bulletin HR2, Jan. 20, 1956, copy in Div. 38, published by Du Pont.

LEON J. BERCOVITZ, *Primary Examiner.*

LOUISE P. QUAST, *Examiner.*